US010291888B2

(12) United States Patent
Aizaki et al.

(10) Patent No.: US 10,291,888 B2
(45) Date of Patent: May 14, 2019

(54) PROJECTION DISPLAY DEVICE (71) Applicant: JVC KENWOOD Corporation, Yokohama-shi, Kanagawa (JP)

(72) Inventors: Takatsugu Aizaki, Yokohama (JP); Hiroshi Watanabe, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 15/661,221

(22) Filed: Jul. 27, 2017

(65) Prior Publication Data

US 2018/0063489 A1    Mar. 1, 2018

(30) Foreign Application Priority Data

Sep. 1, 2016  (JP) ................................ 2016-171168

(51) Int. Cl.
*H04N 9/31*       (2006.01)
(52) U.S. Cl.
CPC ......... *H04N 9/3105* (2013.01); *H04N 9/3144* (2013.01); *H04N 9/3161* (2013.01); *H04N 9/3167* (2013.01)
(58) Field of Classification Search
None
See application file for complete search history.

(56) References Cited

U.S. PATENT DOCUMENTS

| | | | | |
|---|---|---|---|---|
| 7,131,737 | B2 * | 11/2006 | Silverstein | G03B 21/14 353/119 |
| 2004/0212748 | A1 * | 10/2004 | Suzuki | H04N 9/3105 349/8 |
| 2006/0044515 | A1 * | 3/2006 | Suzuki | H04N 9/3105 353/20 |
| 2006/0170837 | A1 * | 8/2006 | Asami | H04N 9/3105 349/50 |
| 2006/0197915 | A1 * | 9/2006 | Kobayashi | H04N 9/3105 353/31 |
| 2011/0249205 | A1 * | 10/2011 | Sato | G03B 21/16 349/5 |

(Continued)

FOREIGN PATENT DOCUMENTS

JP       2006-195267       7/2006

*Primary Examiner* — Edward J Glick
*Assistant Examiner* — David Y Chung
(74) *Attorney, Agent, or Firm* — Amin, Turocy & Watson LLP (57) ABSTRACT

A projection display device includes: a light source device which emits source light; a first polarizer passes the source light in a first polarization state; a reflective liquid crystal panel; an illumination optical system which causes the source light to be incident to the reflective liquid crystal panel; a second polarizer passes the source light in the first polarization state from the first polarizer, and reflects the source light in a second polarization state from the reflective liquid crystal panel; a projection optical system which projects the source light reflected by the second polarizer; a support member which includes an outer member that supports the first polarizer and the reflective liquid crystal panel and an inner member that is fixed to the outer member in an internal space of the outer member and supports the second polarizer; and a seal mechanism which seals the internal space.

6 Claims, 5 Drawing Sheets

(56) References Cited

U.S. PATENT DOCUMENTS

2012/0182486 A1\* 7/2012 Haruyama ........... H04N 9/3105
　　　　　　　　　　　　　　　　　　　　　　　　349/5
2012/0200804 A1\* 8/2012 Kobayashi ........ G02F 1/133632
　　　　　　　　　　　　　　　　　　　　　　　　349/62

\* cited by examiner

PROJECTION DISPLAY DEVICE

CROSS-REFERENCE TO RELATED APPLICATION(S)

The present application claims priority to and incorporates by reference the entire contents of Japanese Patent Application No. 2016-171168 filed in Japan on Sep. 1, 2016.

BACKGROUND OF THE INVENTION

1. Field of the Invention

The present invention relates to a projection display device.

2. Description of the Related Art

A projection display device, which includes a polarizer to which light from a light source is incident and a reflective liquid crystal panel to which light passing through the polarizer is incident, has been known. Japanese Laid-open Patent Publication No. 2006-195267 discloses a projection display device which includes a triangular prism which supports a wire grid polarizer and a reflective liquid crystal panel. In Japanese Laid-open Patent Publication No. 2006-195267, the wire grid polarizer is fixed to the triangular prism by an adhesive. As an internal space of the triangular prism is sealed, invasion of a foreign substance into the internal space of the triangular prism is prevented.

In a case where the light passing through the polarizer is incident to the reflective liquid crystal panel, and the light which has been reflected by the reflective liquid crystal panel is reflected by the polarizer and transmitted to a projection optical system, there is a possibility that the quality of an image projected by the projection optical system may deteriorate when stress acts on the polarizer and the polarizer is distorted and deformed.

SUMMARY OF THE INVENTION

It is an object of the present invention to at least partially solve the problems in the conventional technology.

According an aspect of the embodiment, a projection display device is provided which comprises: a light source device which emits source light; a first polarizer which is arranged in an optical path of the source light and passes the source light in a first polarization state; a reflective liquid crystal panel which is arranged in an optical path of the source light, and performs light modulation of the source light from the first polarizer based on image data; an illumination optical system which causes the source light to be incident to the reflective liquid crystal panel; a second polarizer which is arranged in an optical path of the source light between the first polarizer and the reflective liquid crystal panel, passes the source light in the first polarization state from the first polarizer, and reflects the source light in a second polarization state from the reflective liquid crystal panel; a projection optical system which projects the source light reflected by the second polarizer; a support member which includes an outer member that supports the first polarizer and the reflective liquid crystal panel and an inner member that is fixed to the outer member in an internal space of the outer member and supports the second polarizer; and a seal mechanism which seals the internal space.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according the invention will be described with reference to the drawings, but the invention is not limited thereto. Components of the embodiment to be described later can be appropriately combined with each other. In addition, there is also a case where some components are not used.

In the following description, an XYZ orthogonal coordinate system will be set to describe a positional relationship among the respective units referring to this XYZ orthogonal coordinate system. A direction parallel to an X-axis, which is a first axis in a predetermined plane, will be set as an X-axis direction, a direction parallel to a Y-axis, which is a second axis orthogonal to the first axis in the predetermined plane, will be set as a Y-axis direction, and a direction parallel to a Z-axis, which is a third axis orthogonal to the first axis and the second axis, will be set as a Z-axis direction. The third axis is orthogonal to the predetermined plane. In addition, one direction of the X-axis direction will be set as a +X direction, and a reverse direction of the +X direction will be set as a −X direction. One direction of the Y-axis direction will be set as a +Y direction, and a reverse direction of the +Y direction will be set as a −Y direction. One direction of the Z-axis direction will be set as a +Z direction, and a reverse direction of the +Z direction will be set as a −Z direction. In the present embodiment, the predetermined plane is parallel to a horizontal plane, and the Z-axis direction is a vertical direction. In the following description, the predetermined plane will be appropriately referred to as an XY plane.

Figure 1:
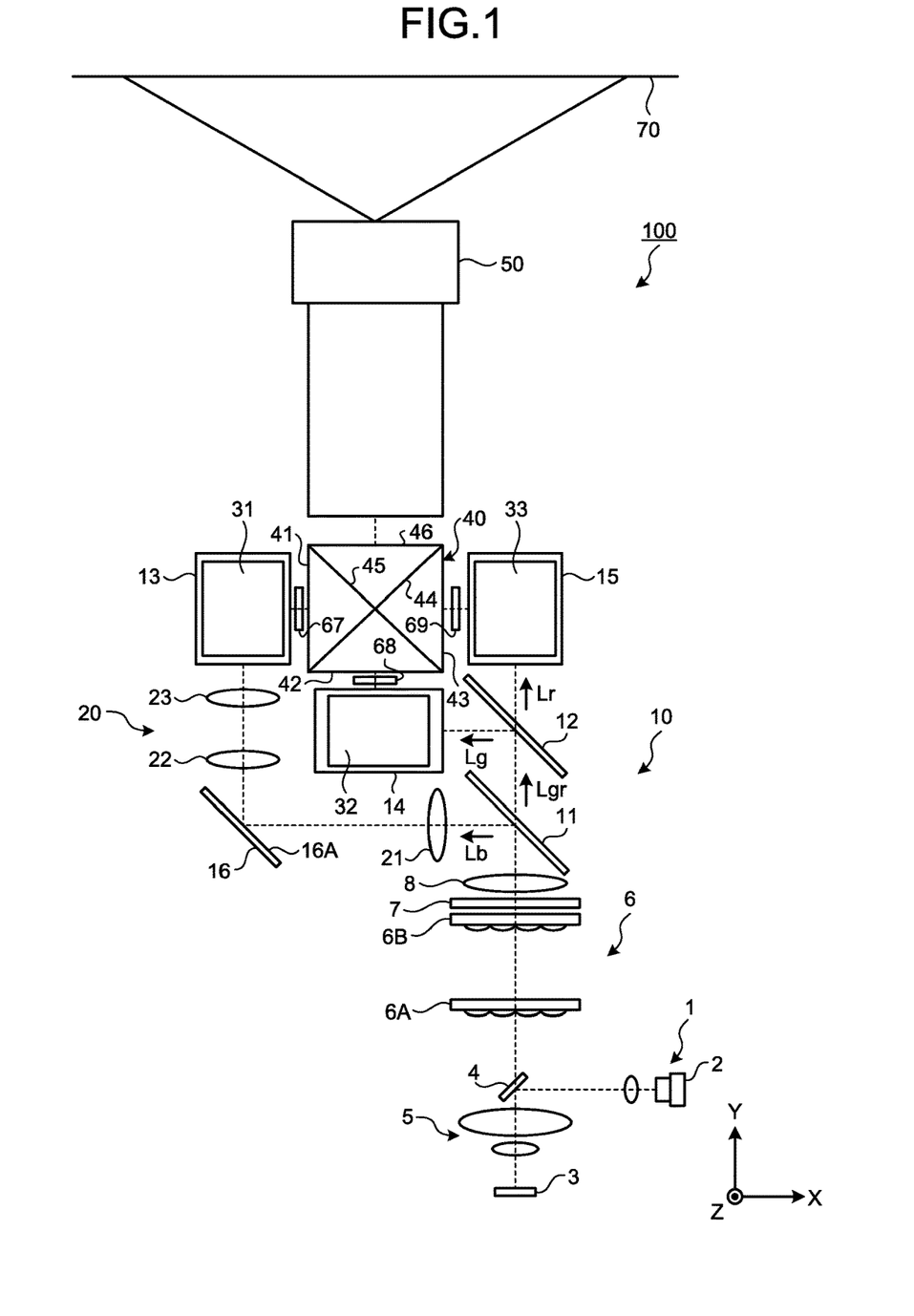
FIG. 1 is a plan view schematically illustrating an example of a projection display device according to the present embodiment.
Figure 2:
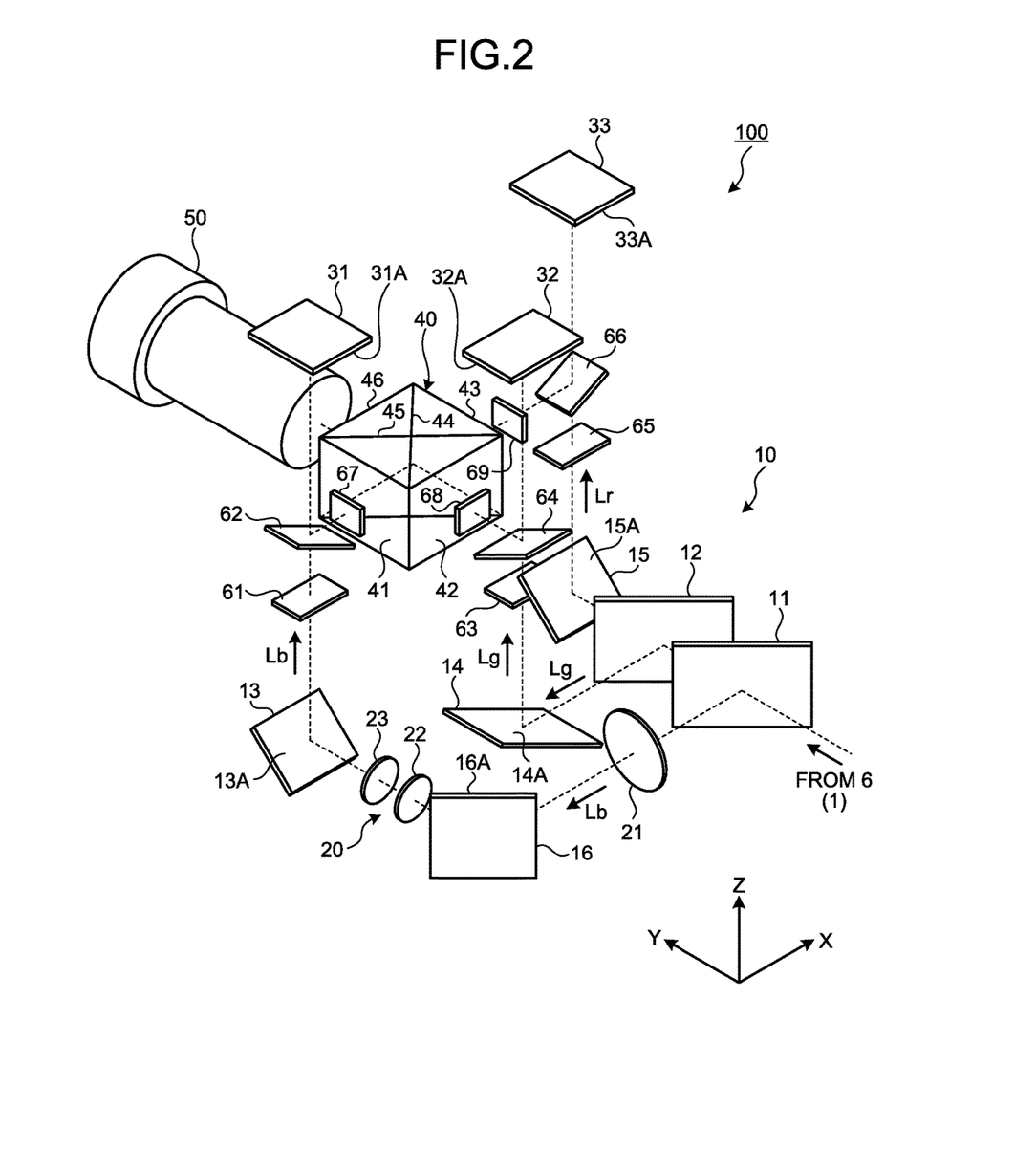
FIG. 2 is a perspective view schematically illustrating an example of the projection display device according to the present embodiment.

FIG. 1 is a plan view schematically illustrating an example of a projection display device 100 according to the present embodiment. FIG. 2 is a perspective view schematically illustrating an example of the projection display device 100 according to the present embodiment. As illustrated in FIGS. 1 and 2, the projection display device 100 includes: a light source device 1 which emits light (source light); an illumination optical system 10 which includes a first color separation element 11 and a second color separation element 12 and generates first color light Lb, second color light Lg, and third color light Lr by performing color separation of light emitted from the light source device 1; a first reflective liquid crystal panel 31, a second reflective liquid crystal panel 32, and a third reflective liquid crystal panel 33 which are arranged in optical paths of the first color light Lb, the second color light Lg, and the third color light Lr, respectively, generated by the illumination optical system 10 and perform light modulation of the first color light Lb, the second color light Lg, and the third color light Lr, respectively, based on image data; a combining optical system 40 which combines the first color light Lb, the second color light Lg, and the third color light Lr, which have been subjected to the light modulation by the first reflective liquid crystal panel 31, the second reflective liquid crystal panel 32, and the third reflective liquid crystal panel 33, to generate combined light; and a projection optical system 50 which projects the combined light generated by the combining optical system 40.

The light source device 1 generates white light as the source light. In the present embodiment, the light source device 1 includes a solid light source 2 which emits excitation light, a phosphor 3 which generates fluorescent light by being irradiated with the excitation light, a half mirror 4 which guides the excitation light emitted from the solid light source 2 to the phosphor 3, and a light-collection optical system 5 which condenses the excitation light with which the phosphor 3 is irradiated. The solid light source 2 includes a laser diode (LD). The solid light source 2 emits blue laser light as the excitation light. The phosphor 3 is irradiated with the excitation light emitted from the solid light source 2 via the half mirror 4 and the light-collection optical system 5. When being irradiated with the excitation light, the phosphor 3 generates yellow fluorescent light. The white light is generated based on the excitation light and the fluorescent light. The white light generated by the light source device 1 is incident to the illumination optical system 10.

The illumination optical system 10 performs color separation of the light emitted from the light source device 1 to generate the plurality of color light Lb, Lg and Lr. The illumination optical system 10 causes the first color light Lb to be incident to the first reflective liquid crystal panel 31, the second color light Lg to be incident to the second reflective liquid crystal panel 32, and the third color light Lr to be incident to the third reflective liquid crystal panel 33. The illumination optical system 10 includes: an integrator optical system 6 to which the light from the light source device 1 is incident; a first color separation element 11 which separates the first color light Lb from the light emitted from the integrator optical system 6 and emits the light Lb in the −X direction; a second color separation element 12 which separates the light Lgr emitted from the first color separation element 11 into the second color light Lg and the third color light Lr and emits the second color light Lg in the −X direction and the third color light Lr in the +Y direction; a first reflective member 13 which reflects the first color light Lb emitted from the first color separation element 11 to the +Z direction; a second reflective member 14 which reflects the second color light Lg emitted from the second color separation element 12 to the +Z direction; a third reflective member 15 which reflects the third color light Lr emitted from the second color separation element 12 to the +Z direction; and a relay optical system 20 which is arranged in the optical path of the first color light Lb and forms an erect image.

The integrator optical system 6 equalizes illuminance of light emitted from the light source device 1. The integrator optical system 6 includes a first lens array 6A, a second lens array 6B, a polarization conversion element 7, and a condenser lens 8. A light axis of the integrator optical system 6 is parallel to the Y-axis. The light emitted from the integrator optical system 6 advances in the +Y direction.

The first lens array 6A includes a plurality of micro lenses arranged in a matrix form inside an XZ plane. The second lens array 6B includes a plurality of micro lenses arranged in a matrix form inside the XZ plane. The plurality of micro lenses of the first lens array 6A and the plurality of micro lenses of the second lens array 6B have one-to-one correspondence. The polarization conversion element 7 includes a plurality of polarization conversion units. The polarization conversion unit includes a polarization separation film, a reflective mirror, and a phase plate. The plurality of micro lenses of the second lens array 6B and the plurality of polarization conversion units of the polarization conversion element 7 have one-to-one correspondence.

The light which has been emitted from the light source device 1 and incident to the integrator optical system 6 is incident to each of the plurality of micro lenses of the first lens array 6A. A portion of the light incident to an incident surface of the integrator optical system 6 is incident to each of the plurality of micro lenses of the first lens array 6A according to each position of the micro lenses. Thus, light received by the micro lens differ from each other. The respective micro lenses of the first lens array 6A condense the light emitted from the light source device 1 onto the respective micro lenses of the second lens array 6B corresponding to the respective micro lenses of the first lens array 6A. A secondary light source image is formed in each of the plurality of micro lenses of the second lens array 6B. The second lens array 6B forms an optical pupil of the first lens array 6A.

Light from the secondary light source image formed in the respective micro lenses of the second lens array 6B is incident to the respective polarization conversion units of the polarization conversion element 7 corresponding to the micro lenses of the second lens array 6B. The light incident to the polarization conversion unit is separated into light in a first polarization state and light in a second polarization state by the polarization separation film. The light in the second polarization state separated by the polarization separation film is reflected by the reflective mirror, and then, is converted into light in the first polarization state by passing through the phase plate. That is, the light emitted from the light source device 1 is converted into light in the first polarization state by passing through the polarization conversion element 7.

The light emitted from each of the plurality of polarization conversion units is incident to the condenser lens 8. The condenser lens 8 causes the light emitted from each of the plurality of polarization conversion units to be superimposed on each other to form a single light flux. Accordingly, the illuminance distribution in each of the first reflective liquid crystal panel 31, the second reflective liquid crystal panel 32, and the third reflective liquid crystal panel 33 is equalized.

Incidentally, the integrator optical system 6 may include a rod integrator.

The first color separation element 11 is arranged on the +Y side of the integrator optical system 6. The first color separation element 11 includes a dichroic mirror. The first color separation element 11 separates the first color light Lb from the light which has emitted from the light source device 1 and passed through the integrator optical system 6. In the present embodiment, the first color separation element 11 separates the white light from the light source device 1 into blue light as the first color light Lb and the light Lgr having a different wavelength from the blue light. The first color light Lb as the blue light is reflected by the first color separation element 11 and proceeds in the −X direction. The light Lgr having the different wavelength from the blue light passes through the first color separation element 11 and proceeds in the +Y direction.

The second color separation element 12 is arranged on the +Y side of the first color separation element 11. The second color separation element 12 includes a dichroic mirror. The second color separation element 12 separates the light Lgr having the different wavelength from the blue light emitted from the first color separation element 11 into the second color light Lg and the third color light Lr. In the present embodiment, the second color separation element 12 separates the light Lgr emitted from the first color separation element 11 into green light as the second color light Lg and red light as the third color light Lr. The second color light Lg as the green light is reflected by the second color separation element 12 and proceeds in the −X direction. The third color light Lr as the red light passes through the second color separation element 12 and proceeds in the +Y direction.

The first reflective member 13 reflects the first color light Lb from the first color separation element 11 in the +Z direction. In the present embodiment, the illumination optical system 10 includes a fourth reflective member 16 which is arranged between the first color separation element 11 and the first reflective member 13. The fourth reflective member 16 reflects the first color light Lb from the first color separation element 11 in the +Y direction. The fourth reflective member 16 is arranged on the −X side of the first color separation element 11. The first color light Lb proceeding in the −X direction from the first color separation element 11 is reflected by a reflective surface 16A of the fourth reflective member 16 and proceeds in the +Y direction. The first reflective member 13 is arranged on the +Y side of the fourth reflective member 16. The first color light Lb proceeding in the +Y direction from the fourth reflective member 16 is reflected by a reflective surface 13A of the first reflective member 13 and proceeds in the +Z direction.

The second reflective member 14 reflects the second color light Lg from the second color separation element 12 in the +Z direction. The second reflective member 14 is arranged on the −X side of the second color separation element 12. The second color light Lg proceeding in the −X direction from the second color separation element 12 is reflected by a reflective surface 14A of the second reflective member 14 and proceeds in the +Z direction.

The third reflective member 15 reflects the third color light Lr from the second color separation element 12 in the +Z direction. The third reflective member 15 is arranged on the +Y side of the second color separation element 12. The third color light Lr proceeding in the +Y direction from the second color separation element 12 is reflected by a reflective surface 15A of the third reflective member 15 and proceeds in the +Z direction.

In the present embodiment, the reflective surface 13A of the first reflective member 13 and the reflective surface 15A of the third reflective member 15 are parallel to each other. The reflective surface 13A of the first reflective member 13 is parallel to the X-axis and is inclined in the +Z direction toward the +Y direction. Similarly, the reflective surface 15A of the third reflective member 15 is parallel to the X-axis and is inclined in the +Z direction toward the +Y direction.

In the present embodiment, the reflective surface 13A of the first reflective member 13 and the reflective surface 15A of the third reflective member 15 are arranged in the same plane. The plane including the reflective surface 13A of the first reflective member 13 and the reflective surface 15A of the third reflective member 15 is orthogonal to a plane including the reflective surface 14A of the second reflective member 14. In the present embodiment, the reflective surface 14A of the second reflective member 14 is parallel to the Y-axis and is inclined in the +Z direction toward the −X direction.

The relay optical system 20 is arranged in the optical path of the first color light Lb between the first color separation element 11 and the first reflective liquid crystal panel 31. In the present embodiment, the relay optical system 20 is arranged in the optical path of the first color light Lb between the first color separation element 11 and the first reflective member 13. The relay optical system 20 images an erect image of an object, which is on an object plane side of the relay optical system 20, on an image plane side of the relay optical system 20.

The relay optical system 20 includes: a first condenser lens 21 arranged between the first color separation element 11 and the fourth reflective member 16; and a second condenser lens 22 and a third condenser lens 23 which are arranged between the fourth reflective member 16 and the first reflective member 13. Each of the first condenser lens 21, the second condenser lens 22, and the third condenser lens 23 is a convex lens. The third condenser lens 23 is optically conjugate with the second lens array 6B. Since the third condenser lens 23 and the second lens array 6B are optically conjugate, and the second lens array 6B acts as the pupil of the first lens array 6A, images of the respective micro lenses of the first lens array 6A are formed between the second lens array 6B and the third condenser lens 23.

In the present embodiment, the relay optical system 20 forms an erect image of an object on the image plane side of the relay optical system 20. For example, when an image X is formed on the object plane side of the relay optical system 20, the relay optical system 20 forms an inverted image of the image X between the first color separation element 11 and the first reflective liquid crystal panel 31 which is the image plane, and forms an erect image of the image X on the image plane side of the relay optical system 20. In the present embodiment, the image X represents each portion of images of light emitted from the light source device 1 and received by the plurality of micro lenses of the first lens array 6A.

The first reflective liquid crystal panel 31 is arranged in the optical path of the first color light Lb. The first reflective liquid crystal panel 31 is a light modulation element which performs light modulation of the first color light Lb from the first reflective member 13 based on image data. The first reflective liquid crystal panel 31 is arranged on the +Z side of the first reflective member 13. The first color light Lb proceeding in the +Z direction from the first reflective member 13 is incident to the first reflective liquid crystal panel 31.

The first reflective liquid crystal panel 31 includes a first incident surface 31A to which the first color light Lb from the first reflective member 13 is incident. The first reflective liquid crystal panel 31 reflects the first color light Lb from the first reflective member 13 in the −Z direction.

The second reflective liquid crystal panel 32 is arranged in the optical path of the second color light Lg. The second reflective liquid crystal panel 32 is a light modulation element which performs light modulation of the second color light Lg from the second reflective member 14 based on image data. The second reflective liquid crystal panel 32 is arranged on the +Z side of the second reflective member 14. The second color light Lg proceeding in the +Z direction from the second reflective member 14 is incident to the second reflective liquid crystal panel 32.

The second reflective liquid crystal panel 32 includes a second incident surface 32A to which the second color light Lg from the second reflective member 14 is incident. The second reflective liquid crystal panel 32 reflects the second color light Lg from the second reflective member 14 in the −Z direction.

The third reflective liquid crystal panel 33 is arranged in the optical path of the third color light Lr. The third reflective liquid crystal panel 33 is a light modulation element which performs light modulation of the third color light Lr from the third reflective member 15 based on image data. The third reflective liquid crystal panel 33 is arranged on the +Z side of the third reflective member 15. The third color light Lr proceeding in the +Z direction from the third reflective member 15 is incident to the third reflective liquid crystal panel 33.

The third reflective liquid crystal panel 33 includes a third incident surface 33A to which the third color light Lr from the third reflective member 15 is incident. The third reflective liquid crystal panel 33 reflects the third color light Lr from the third reflective member 15 in the −Z direction.

The first incident surface 31A of the first reflective liquid crystal panel 31 is parallel to the XY plane and faces the −Z direction. Similarly, the second incident surface 32A of the second reflective liquid crystal panel 32 and the third incident surface 33A of the third reflective liquid crystal panel 33 are parallel to the XY plane and face the −Z direction. In the present embodiment, the first incident surface 31A of the first reflective liquid crystal panel 31, the second incident surface of the second reflective liquid crystal panel 32, and the third incident surface 33A of the third reflective liquid crystal panel 33 are arranged in the same plane which is parallel to the XY plane.

A first polarizer 61 and a second polarizer 62 are arranged in the optical path of the first color light Lb between the first reflective member 13 and the first reflective liquid crystal panel 31. A third polarizer 63 and a fourth polarizer 64 are arranged in the optical path of the second color light Lg between the second reflective member 14 and the second reflective liquid crystal panel 32. A fifth polarizer 65 and a sixth polarizer 66 are arranged in the optical path of the third color light Lr between the third reflective member 15 and the third reflective liquid crystal panel 33.

The first polarizer 61 passes the first color light Lb in the first polarization state which has been reflected by the first reflective member 13. The first color light Lb in the first polarization state which has passed through the first polarizer 61 is incident to the first reflective liquid crystal panel 31 through the second polarizer 62. The first reflective liquid crystal panel 31 performs light modulation of the first color light Lb from the first polarizer 61 based on the image data. The second polarizer 62 is arranged in the optical path of the first color light Lb between the first polarizer 61 and the first reflective liquid crystal panel 31. The second polarizer 62 passes the first color light Lb in the first polarization state from the first polarizer 61, and reflects the first color light Lb in the second polarization state from the first reflective liquid crystal panel 31 to the combining optical system 40.

The third polarizer 63 passes the second color light Lg in the first polarization state which has been reflected by the second reflective member 14. The second color light Lg in the first polarization state which has passed through the third polarizer 63 is incident to the second reflective liquid crystal panel 32 through the fourth polarizer 64. The second reflective liquid crystal panel 32 performs light modulation of the second color light Lg from the third polarizer 63 based on the image data. The fourth polarizer 64 is arranged in the optical path of the second color light Lg between the third polarizer 63 and the second reflective liquid crystal panel 32. The fourth polarizer 64 passes the second color light Lg in the first polarization state from the third polarizer 63, and reflects the second color light Lg in the second polarization state from the second reflective liquid crystal panel 32 to the combining optical system 40.

The fifth polarizer 65 passes the third color light Lr in the first polarization state which has been reflected by the third reflective member 15. The third color light Lr in the first polarization state which has passed through the fifth polarizer 65 is incident to the third reflective liquid crystal panel 33 through the sixth polarizer 66. The third reflective liquid crystal panel 33 performs light modulation of the third color light Lr from the fifth polarizer 65 based on the image data. The sixth polarizer 66 is arranged in the optical path of the third color light Lr between the fifth polarizer 65 and the third reflective liquid crystal panel 33. The sixth polarizer 66 passes the third color light Lr in the first polarization state from the fifth polarizer 65, and reflects the third color light Lr in the second polarization state from the third reflective liquid crystal panel 33 to the combining optical system 40.

A transmissive polarizer 67 is arranged in the optical path of the first color light Lb between the second polarizer 62 and the combining optical system 40. The transmissive polarizer 67 passes the first color light Lb in the second polarization state out of the first color light Lb which has been emitted from the second polarizer 62 to the combining optical system 40 and prevents passage of the first color light Lb in the first polarization state which is unnecessary.

A transmissive polarizer 68 is arranged in the optical path of the second color light Lg between the fourth polarizer 64 and the combining optical system 40. The transmissive polarizer 68 passes the second color light Lg in the second polarization state out of the second color light Lg which has been emitted from the fourth polarizer 64 to the combining optical system 40 and prevents passage of the second color light Lg in the first polarization state which is unnecessary.

A transmissive polarizer 69 is arranged in the optical path of the third color light Lr between the sixth polarizer 66 and the combining optical system 40. The transmissive polarizer 69 passes the third color light Lr in the second polarization state out of the third color light Lr which has been emitted from the sixth polarizer 66 to the combining optical system 40 and prevents passage of the third color light Lr in the first polarization state which is unnecessary.

Incidentally, the first polarization state is, for example, a P-polarized state. The second polarization state is, for example, an S-polarized state.

In the present embodiment, the first, second, third incident surfaces 31A, 32A and 33A of the first, second, third reflective liquid crystal panels 31, 32 and 33 are optically conjugate with the plurality of micro lenses of the first lens array 6A, respectively. Thus, images of the plurality of micro lenses of the first lens array 6A are superimposed on each other in the first, second, third incident surfaces 31A, 32A and 33A of the first, second, third reflective liquid crystal panels 31, 32 and 33. Accordingly, the illuminance distribution in the first, second, third incident surfaces 31A, 32A and 33A of the first, second, third reflective liquid crystal panels 31, 32 and 33 are equalized.

The combining optical system 40 combines the first color light Lb which has been light modulated by the first reflective liquid crystal panel 31 and reflected by the second polarizer 62, the second color light Lg which has been light modulated by the second reflective liquid crystal panel 32 and reflected by the fourth polarizer 64, and the third color light Lr which has been light modulated by the third reflective liquid crystal panel 33 and reflected by the sixth polarizer 66 to generate the combined light. In the present embodiment, the combining optical system 40 includes a cross dichroic prism. The combining optical system 40 includes: an incident surface 41 to which the first color light Lb which has been light modulated by the first reflective liquid crystal panel 31 and reflected by the second polarizer 62 is incident; an incident surface 42 to which the second color light Lg which has been light modulated by the second reflective liquid crystal panel 32 and reflected by the fourth polarizer 64 is incident; an incident surface 43 to which the third color light Lr which has been light modulated by the third reflective liquid crystal panel 33 and reflected by the sixth polarizer 66 is incident; and an emitting surface 46 which emits the combined light.

The incident surface 41 is parallel to a YZ plane and faces the −X direction. The incident surface 42 is parallel to the XZ plane and faces the −Y direction. The incident surface 43 is parallel to the YZ plane and faces the +X direction. The emitting surface 46 is parallel to the XZ plane and faces the +Y direction.

The combining optical system 40 includes: a first combining surface 44 to combine the first color light Lb incident from the incident surface 41 and the second color light Lg incident from the incident surface 42; and a second combining surface 45 to combine the third color light Lr incident from the incident surface 43 and the second color light Lg incident from the incident surface 42. The first combining surface 44 and the second combining surface 45 are parallel to the Z-axis. The first combining surface 44 and the second combining surface 45 are orthogonal to each other.

The projection optical system 50 projects, onto a screen 70, the combined light which is generated by combining the first color light Lb which has been light modulated by the first reflective liquid crystal panel 31 and reflected by the second polarizer 62, the second color light Lg which has been light modulated by the second reflective liquid crystal panel 32 and reflected by the fourth polarizer 64, and the third color light Lr which has been light modulated by the third reflective liquid crystal panel 33 and reflected by the sixth polarizer 66 using the combining optical system 40 and is emitted from the emitting surface 46.

Figure 3:
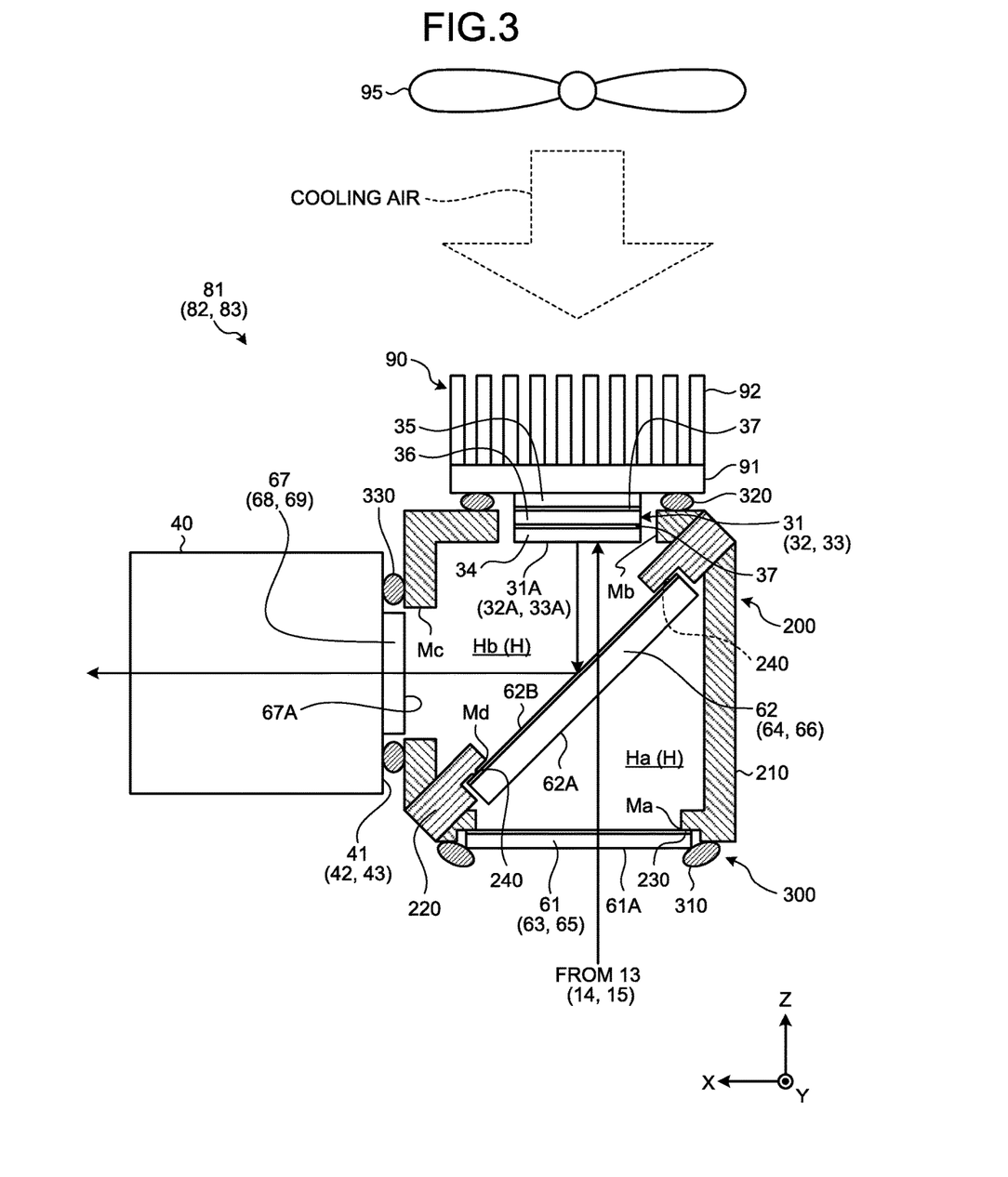
FIG. 3 is a cross-sectional view schematically illustrating a part of the projection display device according to the present embodiment.

FIG. 3 is a cross-sectional view schematically illustrating a part of the projection display device 100 according to the present embodiment. FIG. 3 is the view schematically illustrating: the first reflective liquid crystal panel 31; the first polarizer 61 and the second polarizer 62 arranged in the optical path of the first color light Lb between the first reflective liquid crystal panel 31 and the first reflective member 13; and the transmissive polarizer 67 arranged in the optical path of the first color light Lb between the second polarizer 62 and the combining optical system 40.

As illustrated in FIGS. 2 and 3, the first reflective liquid crystal panel 31 is arranged in the +Z direction more than the combining optical system 40. The second polarizer 62 is arranged on the −Z side of the first reflective liquid crystal panel 31. The first polarizer 61 is arranged on the −Z side of the second polarizer 62.

The first reflective liquid crystal panel 31 includes a transparent substrate 34 including transparent electrodes, an active matrix substrate 35 including reflective electrodes, and a liquid crystal layer 36 provided between the transparent substrate 34 and the active matrix substrate 35. An alignment film 37 is provided on a top surface of the transparent substrate 34 facing the liquid crystal layer 36. The alignment film 37 is provided on a top surface of the active matrix substrate 35 facing the liquid crystal layer 36.

The reflective electrodes are arranged in a matrix form for every pixel in the active matrix substrate 35. The transparent substrate 34 and the active matrix substrate 35 are arranged such that the transparent electrode and the reflective electrode oppose each other. An outer surface of the transparent substrate 34 includes the first incident surface 31A. The liquid crystal layer 36 includes a nematic liquid crystal which is arranged between the transparent electrode and the reflective electrode. The nematic liquid crystal has a negative dielectric anisotropy. The nematic liquid crystal is provided between the transparent substrate 34 and the active matrix substrate 35 in a state where a pre-tilt angle is given.

The first polarizer 61 is a wire grid polarizer. The first polarizer 61 is arranged in the optical path of the first color light Lb between the first reflective member 13 and the first reflective liquid crystal panel 31. The first polarizer 61 passes the first color light Lb of the first polarization state which has been reflected by the first reflective member 13. The first color light Lb which has passed through the first polarizer 61 is incident to the first reflective liquid crystal panel 31 via the second polarizer 62. The first reflective liquid crystal panel 31 performs light modulation of the first color light Lb from the second polarizer 62 based on the image data. In the present embodiment, the first color light Lb in the first polarization state is incident to the first polarizer 61 by the polarization conversion element 7. The first polarizer 61 passes the first color light Lb in the first polarization state from the first reflective member 13.

The second polarizer 62 is a wire grid polarizer. The second polarizer 62 is arranged in the optical path of the first color light Lb between the first polarizer 61 and the first reflective liquid crystal panel 31. The second polarizer 62 passes the first color light Lb in the first polarization state from the first polarizer 61. The first color light Lb which has passed through the second polarizer 62 is incident to the first incident surface 31A of the transparent substrate 34 of the first reflective liquid crystal panel 31. The first color light Lb which has been incident to the first incident surface 31A is incident to the liquid crystal layer 36 via the transparent substrate 34, passes through the liquid crystal layer 36, and then, is reflected by the reflective electrode of the active matrix substrate 35. The first color light Lb which has been reflected by the reflective electrode of the active matrix substrate 35 passes through the liquid crystal layer 36 again, and then, is emitted from the transparent substrate 34 of the first reflective liquid crystal panel 31. The first color light Lb in the second polarization state is emitted from the first reflective liquid crystal panel 31. The first color light Lb in the second polarization state which has been emitted from the first reflective liquid crystal panel 31 is incident to the second polarizer 62.

The second polarizer 62 reflects the first color light Lb in the second polarization state from the first reflective liquid crystal panel 31 in the +X direction. The second polarizer 62 reflects the first color light Lb in the second polarization state from the first reflective liquid crystal panel 31 to be transmitted to the combining optical system 40. The first color light Lb which has been reflected by the second polarizer 62 and proceeded in the +X direction is incident to the combining optical system 40 via the transmissive polarizer 67. The unnecessary first color light Lb in the first polarization state out of the first color light Lb supplied from the second polarizer 62 to the combining optical system 40 is eliminated by the transmissive polarizer 67, and the first color light Lb in the second polarization state is incident to the combining optical system 40.

As illustrated in FIG. 3, the projection display device 100 includes a support member 200 which supports the first polarizer 61, the second polarizer 62, the transmissive polarizer 67, and the first reflective liquid crystal panel 31. In the following description, the first polarizer 61, the second polarizer 62, the transmissive polarizer 67, and the first reflective liquid crystal panel 31, which are supported by the single support member 200, are collectively referred to as a liquid crystal panel assembly 81 if appropriate.

The support member 200 includes: an outer member 210 which supports the first polarizer 61, the first reflective liquid crystal panel 31, and the transmissive polarizer 67; and an inner member 220 which is arranged in an internal space H of the outer member 210 and supports the second polarizer 62. The inner member 220 is fixed to the outer member 210 in the internal space H.

In addition, the projection display device 100 includes a seal mechanism 300 which seals the internal space H of the outer member 210.

The outer member 210 is a member having a rectangular parallelepiped shape. The outer member 210 includes: a first opening Ma for passage of the first color light Lb which has been reflected by the first reflective member 13 of the illumination optical system 10 and incident to the first polarizer 61; a second opening Mb for passage of the first color light Lb which has passed through the first polarizer 61 and the second polarizer 62 and been incident to the first reflective liquid crystal panel 31; and a third opening Mc for passage of the first color light Lb which has been reflected by the second polarizer 62 and incident to the combining optical system 40.

The seal mechanism 300 includes a first seal member 310 which seals the first opening Ma, a second seal member 320 which seals the second opening Mb, and a third seal member 330 which seals the third opening Mc.

The first seal member 310 seals a gap between the first polarizer 61 arranged in the first opening Ma and the outer member 210 around the first polarizer 61, to prevent a gas from flowing between the internal space H of the outer member 210 and an external space of the outer member 210 via the first opening Ma. The first seal member 310 includes an O-ring which is arranged on a top surface of the outer member 210 around the first opening Ma. Incidentally, the first seal member 310 may be a sealing material which is filled into the gap between the first polarizer 61 and the outer member 210 around the first polarizer 61. As the first opening Ma is sealed by the first seal member 310, a foreign substance in the external space of the outer member 210 is prevented from entering the internal space H of the outer member 210 via the first opening Ma.

The second seal member 320 seals a gap between the first reflective liquid crystal panel 31 arranged in the second opening Mb and the outer member 210 around the first reflective liquid crystal panel 31, to prevent a gas from flowing between the internal space H of the outer member 210 and the external space of the outer member 210 via the second opening Mb. The second seal member 320 includes an O-ring which is arranged on a top surface of the outer member 210 around the second opening Mb. Incidentally, the second seal member 320 may be a sealing material which is filled into the gap between the first reflective liquid crystal panel 31 and the outer member 210 around the first reflective liquid crystal panel 31. As the second opening Mb is sealed by the second seal member 320, the foreign substance in the external space of the outer member 210 is prevented from entering the internal space H of the outer member 210 via the second opening Mb.

A cooling mechanism 90 connected to the first reflective liquid crystal panel 31 is provided in the present embodiment. The cooling mechanism 90 cools the first reflective liquid crystal panel 31. The cooling mechanism 90 includes a heat sink which is arranged in the external space of the outer member 210 and contacts a top surface of the active matrix substrate 35 of the first reflective liquid crystal panel 31. The cooling mechanism 90 includes a base plate 91 which contacts the first reflective liquid crystal panel 31 and a plurality of fins 92 provided on the base plate 91. Heat of the first reflective liquid crystal panel 31 is dissipated by the cooling mechanism 90, thereby preventing an excessive temperature rise of the first reflective liquid crystal panel 31. In the present embodiment, the projection display device 100 includes a fan 95 which supplies cooling air to the cooling mechanism 90. As the cooling air is supplied from the fan 95 to the cooling mechanism 90, the cooling effect obtained by the cooling mechanism 90 is improved.

In the present embodiment, an outer shape of the base plate 91 of the cooling mechanism 90 is larger than an outer shape of the first reflective liquid crystal panel 31 and the second opening Mb. At least a part of the base plate 91 of the cooling mechanism 90 opposes the top surface of the outer member 210. The cooling mechanism 90 is supported by the outer member 210 via the second seal member 320. In the present embodiment, the second seal member 320 is arranged in a gap between the top surface of the outer member 210 and the cooling mechanism 90. In the present embodiment, the second seal member 320 seals the second opening Mb by sealing the gap between the top surface of the outer member 210 and the cooling mechanism 90.

The third seal member 330 seals a gap between the transmissive polarizer 67 arranged in the third opening Mc and the outer member 210 around the transmissive polarizer 67, to prevent a gas from flowing between the internal space H of the outer member 210 and an external space of the outer member 210 via the third opening Mc. The third seal member 330 includes an O-ring which is arranged on a top surface of the outer member 210 around the third opening Mc. Incidentally, the third seal member 330 may be a sealing material which is filled into the gap between the transmissive polarizer 67 and the outer member 210 around the transmissive polarizer 67. As the third opening Mc is sealed by the third seal member 330, the foreign substance in the external space of the outer member 210 is prevented from entering the internal space H of the outer member 210 via the third opening Mc.

In the present embodiment, the transmissive polarizer 67 is connected to the combining optical system 40. An outer shape of the incident surface 41 of the combining optical system 40 is larger than an outer shape of the transmissive polarizer 67 and the third opening Mc. At least a part of the incident surface 41 of the combining optical system 40 opposes the top surface of the outer member 210. The combining optical system 40 is supported by the outer member 210 via the third seal member 330. In the present embodiment, the third seal member 330 is arranged in a gap between the top surface of the outer member 210 and the combining optical system 40. In the present embodiment, the third seal member 330 seals the third opening Mc by sealing the gap between the top surface of the outer member 210 and the combining optical system 40.

The outer member 210 supports the first polarizer 61 such that the incident surface 61A of the first polarizer 61 and the Z-axis are orthogonal to each other. The outer member 210 includes a first support portion 230 which is arranged around the first opening Ma and supports an edge of the first polarizer 61. The first color light Lb reflected by the first reflective member 13 proceeds in the +Z direction. The incident surface 61A of the first polarizer 61 and the optical path of the first color light Lb incident to the incident surface 61A of the first polarizer 61 are orthogonal to each other.

The outer member 210 supports the first reflective liquid crystal panel 31 such that the first incident surface 31A of the first reflective liquid crystal panel 31 and the Z-axis are orthogonal to each other. As described above, the first reflective liquid crystal panel 31 is connected to the cooling mechanism 90, and the cooling mechanism 90 is supported by the outer member 210. In the present embodiment, the outer member 210 supports the first reflective liquid crystal panel 31 via the second seal member 320 and the cooling mechanism 90. The first reflective liquid crystal panel 31 is arranged in the +Z direction of the first polarizer 61 and the second polarizer 62. The first color light Lb which has passed through the first polarizer 61 and the second polarizer 62 proceeds in the +Z direction. The first incident surface 31A of the first reflective liquid crystal panel 31 is orthogonal to the optical path of the first color light Lb incident to the first incident surface 31A of the first reflective liquid crystal panel 31.

The outer member 210 supports the transmissive polarizer 67 such that the incident surface 67A of the transmissive polarizer 67 and the X-axis are orthogonal to each other. As described above, the transmissive polarizer 67 is connected to the combining optical system 40, and the combining optical system 40 is supported by the outer member 210. In the present embodiment, the outer member 210 supports the transmissive polarizer 67 via the third seal member 330 and the combining optical system 40. The transmissive polarizer 67 is arranged in the +X direction of the second polarizer 62. The first color light Lb which has been emitted from the first reflective liquid crystal panel 31 and reflected by the second polarizer 62 proceeds in the +X direction. The incident surface 67A of the transmissive polarizer 67 is orthogonal to the optical path of the first color light Lb incident to the incident surface 67A of the transmissive polarizer 67.

The inner member 220 is a plate-shaped member. The inner member 220 includes a fourth opening Md for passage of the first color light Lb incident to the second polarizer 62.

The second polarizer 62 includes: an incident surface 62A to which the first color light Lb from the first polarizer 61 is incident; and a reflective surface 62B to which the first color light Lb from the first reflective liquid crystal panel 31 is incident. The incident surface 62A faces the opposite direction to the reflective surface 62B.

The inner member 220 supports the second polarizer 62 such that the incident surface 62A and the reflective surface 62B of the second polarizer 62 are inclined with respect to the Z-axis. The inner member 220 includes a plurality of second support portions 240 which are arranged around the fourth opening Md and support an edge of the second polarizer 62. The first color light Lb reflected by the first reflective member 13 proceeds in the +Z direction. The incident surface 62A of the second polarizer 62 intersects, at an angle of 45 [°], with the optical path of the first color light Lb incident to the incident surface 62A of the second polarizer 62. The first color light Lb reflected by the first reflective liquid crystal panel 31 proceeds in the −Z direction. The reflective surface 62B of the second polarizer 62 intersects, at an angle of 45 [°], with the optical path of the first color light Lb incident to the reflective surface 62B of the second polarizer 62.

Figure 4:
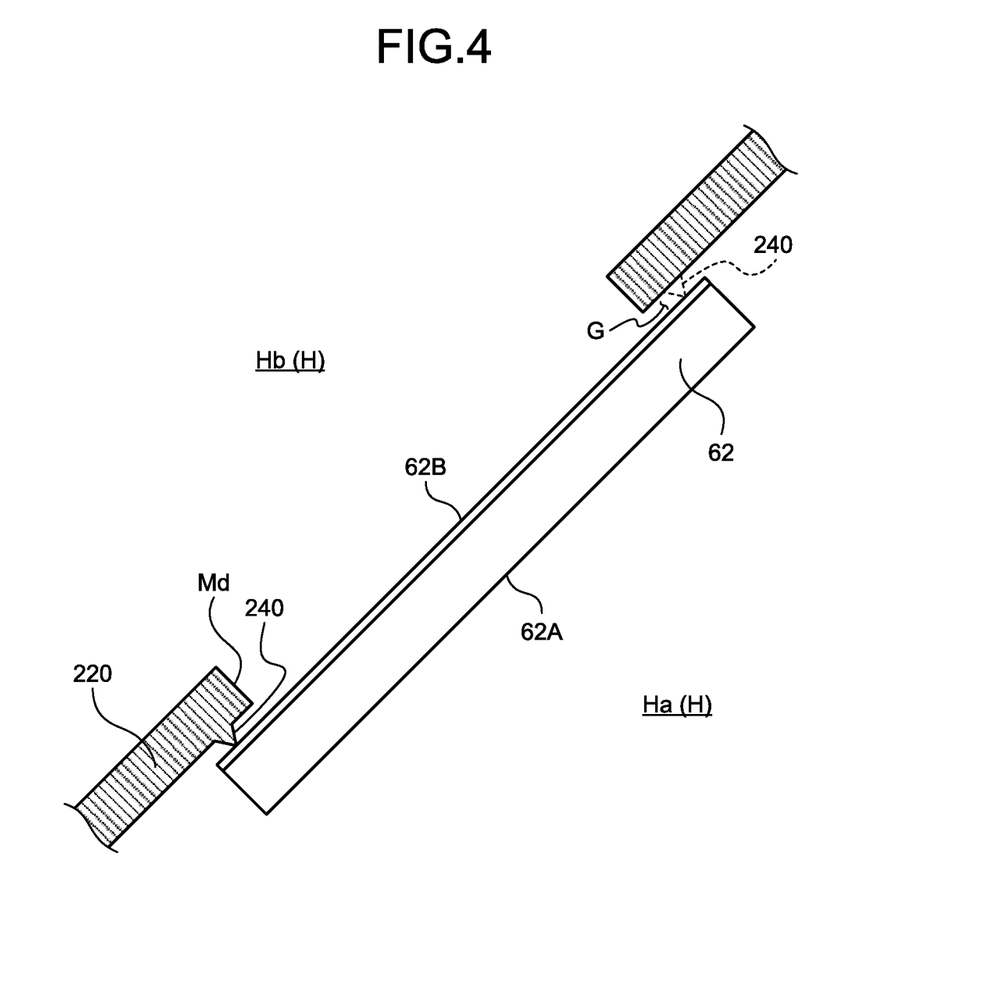
FIG. 4 is an enlarged view illustrating a part of an inner member according to the present embodiment.

FIG. 4 is an enlarged view illustrating a part of the inner member 220 according to the present embodiment. As illustrated in FIGS. 3 and 4, the second support portion 240 includes a protrusion which protrudes from the inner member 220. The plurality of second support portions 240 are provided at interval around the fourth opening Md. That is, the second polarizer 62 is point-supported by the plurality of second support portions 240 in the present embodiment. In the present embodiment, the three second support portions 240 are provided at regular intervals around the fourth opening Md. The second polarizer 62 is supported by three numbers of the second support portions 240 at three points. For example, the second polarizer 62 may be supported through adhesion at three points by applying an adhesive around the plurality of second support portions 240. In addition, for example, the plurality of second support portions 240 may be adhesives or the like to support the second polarizer 62 through adhesion at three points.

The internal space H of the outer member 210 is partitioned into a first space Ha and a second space Hb by the second polarizer 62 which is supported by the inner member 220 and the inner member 220. The first space Ha is a space that the incident surface 62A as one surface of the second polarizer 62 faces. The second space Hb is a space that the reflective surface 62B as the other surface of the second polarizer 62 faces.

A gap G is formed between a part of the inner member 220 where the second support portion 240 is not provided and the second polarizer 62. A gas in the first space Ha can flow into the second space Hb via the gap G. A gas in the second space Hb can flow into the first space Ha via the gap G. That is, in the internal space Hb, the gas can flow from one of the first space Ha and the second space Hb to the other in the present embodiment.

Figure 5:
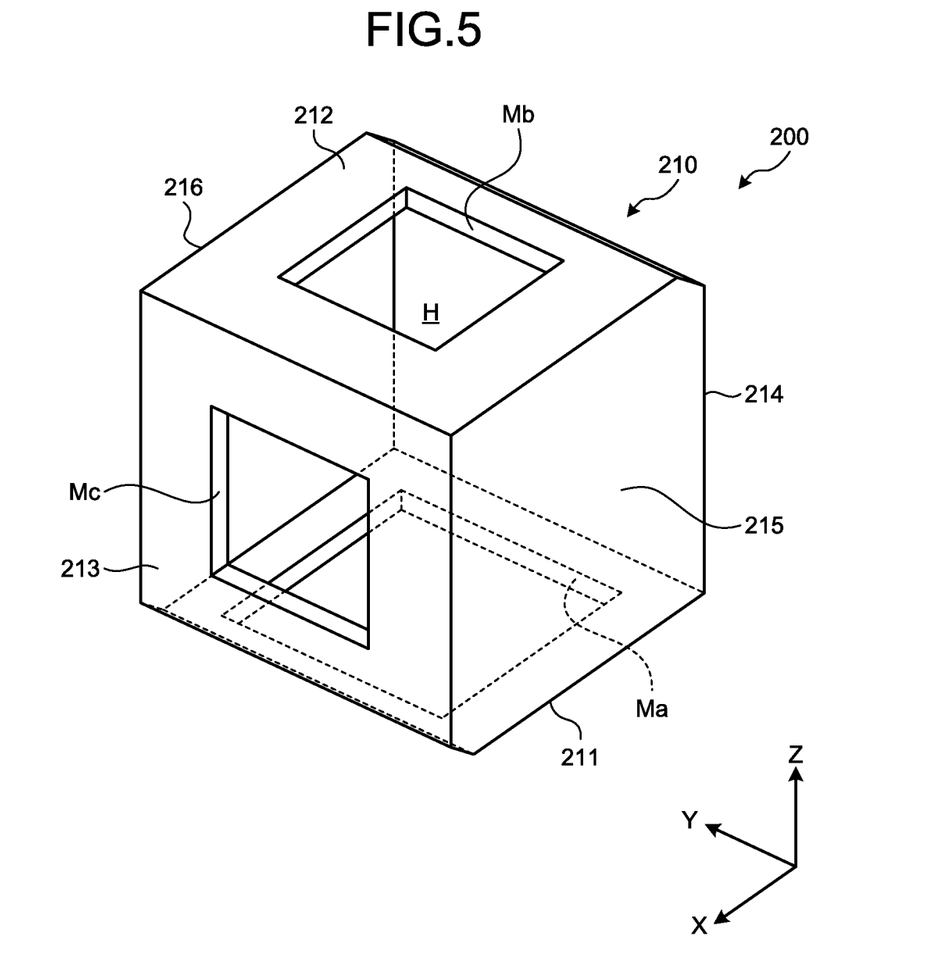
FIG. 5 is a perspective view schematically illustrating an example of an outer member according to the present embodiment.

FIG. 5 is a perspective view schematically illustrating an example of the outer member 210 according to the present embodiment. The outer member 210 is the member having the rectangular parallelepiped shape as illustrated in FIG. 5. The outer member 210 includes: a first plate portion 211 which has the first opening Ma and supports the first polarizer 61; a second plate portion 212 which is arranged in the +Z direction of the first plate portion 211 and has the second opening Mb; a third plate portion 213 which is connected to an end on the +X side of the first plate portion 211 and an end on the +X side of the second plate portion 212 and has the third opening Mc; a fourth plate portion 214 which is connected to an end on the −X side of the first plate portion 211 and an end on the −X side of the second plate portion 212; a fifth plate portion 215 which is connected to an end on the −Y side of the first plate portion 211, an end on the −Y side of the second plate portion 212, an end on the −Y side of the third plate portion 213, and an end on the −Y side of the fourth plate portion 214; and a sixth plate portion 216 which is connected to an end on the +Y side of the first plate portion 211, an end on the +Y side of the second plate portion 212, an end on the +Y side of the third plate portion 213, and an end on the +Y side of the fourth plate portion 214.

The internal space H of the outer member 210 is defined by the first plate portion 211, the second plate portion 212, the third plate portion 213, the fourth plate portion 214, the fifth plate portion 215, and the sixth plate portion 216. No opening is provided in the fourth plate portion 214, the fifth plate portion 215, and the sixth plate portion 216. In addition, the first plate portion 211, the second plate portion 212, the third plate portion 213, the fourth plate portion 214, the fifth plate portion 215, and the sixth plate portion 216 are bonded to each other without any gap. The internal space H is sealed as the first opening Ma, the second opening Mb, and the third opening Mc are sealed.

As above, each action of the first reflective liquid crystal panel 31, the first polarizer 61, the second polarizer 62, the transmissive polarizer 67, and the combining optical system 40 has been described with reference to FIGS. 3 to 5. Each action of the second reflective liquid crystal panel 32, the third polarizer 63, the fourth polarizer 64, the transmissive polarizer 68, and the combining optical system 40 and each action of the third reflective liquid crystal panel 33, the fifth polarizer 65, the sixth polarizer 66, the transmissive polarizer 69, and the combining optical system 40 are the same as each action of the first reflective liquid crystal panel 31, the first polarizer 61, the second polarizer 62, the transmissive polarizer 67, and the combining optical system 40, and thus, will not be described.

In the present embodiment, a liquid crystal panel assembly 82 is configured of the third polarizer 63, the fourth polarizer 64, the transmissive polarizer 68, and the second reflective liquid crystal panel 32 which are supported by the single support member 200. Similarly, a liquid crystal panel assembly 83 is configured of the fifth polarizer 65, the sixth polarizer 66, the transmissive polarizer 69, and the third reflective liquid crystal panel 33 which are supported by the single support member 200. The liquid crystal panel assembly 82 and the liquid crystal panel assembly 83 have the same structure as the liquid crystal panel assembly 81, and thus, will not be described.

As described above, the first polarizer 61, the first reflective liquid crystal panel 31, and the transmissive polarizer 67 are supported by the outer member 210 as a single member according to the present embodiment. Since the internal space H of the outer member 210 is sealed by the seal mechanism 300, the intrusion of the foreign substance into the internal space H is prevented.

Accordingly, it is possible to prevent adhesion of the foreign substance to the incident surface 31A of the first reflective liquid crystal panel 31, adhesion of the foreign substance to the reflective surface 62B of the second polarizer 62, and adhesion of the foreign substance to the incident surface 67A of the transmissive polarizer 67.

The incident surface 31A of the first reflective liquid crystal panel 31 faces the internal space H. As the internal space H is sealed, it is possible to prevent the adhesion of the foreign substance to the incident surface 31A of the first reflective liquid crystal panel 31 facing the internal space H.

Similarly, the reflective surface 62B of the second polarizer 62 and the incident surface 67A of the transmissive polarizer 67 face the internal space H. As the internal space H is sealed, it is possible to prevent the adhesion of the foreign substance to the reflective surface 62B of the second polarizer 62 and the adhesion of the foreign substance to the incident surface 67A of the transmissive polarizer 67.

The first color light Lb, which has been light modulated in the first reflective liquid crystal panel 31 based on the image data, is emitted from the incident surface 31A of the first reflective liquid crystal panel 31, passes through the reflective surface 62B of the second polarizer 62 and the incident surface 67A of the transmissive polarizer 67, is incident to the combining optical system 40, and is projected from the projection optical system 50. If the foreign substance adheres to at least one of the incident surface 31A of the first reflective liquid crystal panel 31, the reflective surface 62B of the second polarizer 62, and the incident surface 67A of the transmissive polarizer 67 through which the modulated first color light Lb passes, the quality of the image projected by the projection optical system 50 deteriorates.

In the present embodiment, it is possible to prevent the adhesion of the foreign substance to each of the incident surface 31A of the first reflective liquid crystal panel 31, the reflective surface 62B of the second polarizer 62, and the incident surface 67A of the transmissive polarizer 67 through which the modulated first color light Lb passes. Accordingly, it is possible to prevent the deterioration in quality of the image projected by the projection optical system 50.

In addition, the second polarizer 62 is arranged in the sealed internal space H in the present embodiment. As the second polarizer 62 is arranged in the sealed internal space H, it is unnecessary to provide the seal member in the entire periphery of the second polarizer 62. When the seal member is provided, there is a possibility that excessive stress or uneven stress, caused by heat generation due to light energy, may act on the second polarizer 62. If the second polarizer 62 is distorted and deformed due to the action of the stress, the first color light Lb, which has been light modulated for each pixel in the first reflective liquid crystal panel 31, is incident to the reflective surface 62B of the deformed second polarizer 62. As a result, there is a possibility that the quality of the image projected by the projection optical system 50 may deteriorate. In the present embodiment, it is unnecessary to provide the seal member around the second polarizer 62, and thus, it is possible to prevent the excessive stress or uneven stress from acting on the second polarizer 62. Accordingly, it is possible to prevent the distortion and deformation of the second polarizer 62 and to prevent the deterioration in quality of the image projected by the projection optical system 50.

In the present embodiment, the second polarizer 62 is point-supported by the plurality of second support portions 240. Accordingly, the action of the excessive stress or uneven stress with respect to the second polarizer 62 is effectively prevented and, the distortion and deformation of the second polarizer 62 is effectively prevented.

In the present embodiment, the first color light Lb from the illumination optical system 10 is incident to the first polarizer 61 of the liquid crystal panel assembly 81, passes through the first polarizer 61 and the second polarizer 62, and then, is incident to the first reflective liquid crystal panel 31. The first color light Lb, which has been reflected by the first reflective liquid crystal panel 31, is reflected by the second polarizer 62, and then, is emitted from the transmissive polarizer 67 of the liquid crystal panel assembly 81. That is, the first color light Lb from the illumination optical system 10 is incident to the combining optical system 40 after passing through the second polarizer 62 twice in the liquid crystal panel assembly 81, and is projected from the projection optical system 50. Thus, there is a possibility that the distortion and deformation of the second polarizer 62 may greatly affect the quality of the image projected by the projection optical system 50 if the second polarizer 62 is distorted and deformed. According to the present embodiment, it is possible to effectively prevent the distortion and deformation of second polarizer 62 through which the first color light Lb passes twice, and thus, it is possible to effectively prevent the deterioration in quality of the image projected by the projection optical system 50.

In addition, it is possible to simplify and downsize the structure of the inner member 220 since it is unnecessary to provide the seal member in the inner member 220, which contributes to downsizing of the liquid crystal panel assembly 81.

In the present embodiment, the first seal member 310 is provided around the first polarizer 61 in the liquid crystal panel assembly 81, and there is a possibility that the first polarizer 61 may be distorted and deformed. Even if the first polarizer 61 is distorted and deformed, the first color light Lb, which has passed through the first polarizer 61 and is incident to the first reflective liquid crystal panel 31, functions as illumination light which illuminates the first reflective liquid crystal panel 31 instead of the modulated light which forms the image. Thus, influence that the distortion and deformation of the first polarizer 61 affects on the image quality is little even if the first polarizer 61 is distorted and deformed. As the first opening Ma in which the first polarizer 61 is arranged is sealed by the first seal member 310, it is possible to prevent the intrusion of foreign substance into the internal space H, and to prevent the deterioration of the quality of the image projected by the projection optical system 50.

In addition, the liquid crystal panel assembly 81 is integrated in the present embodiment, and thus, it is possible to prevent a variation of relative positions among the first polarizer 61, the second polarizer 62, and the first reflective liquid crystal panel 31. Accordingly, it is possible to prevent the deterioration in quality of the image projected by the projection optical system 50.

In addition, the first reflective liquid crystal panel 31 is connected to the cooling mechanism 90, and the second seal member 320 seals the gap between the outer member 210 and the cooling mechanism 90 in the present embodiment. That is, the second seal member 320 does not contact the first reflective liquid crystal panel 31. Accordingly, it is possible to prevent the excessive stress or the uneven stress from acting on the first reflective liquid crystal panel 31. Accordingly, it is possible to prevent the distortion and deformation of the first reflective liquid crystal panel 31 and to prevent the deterioration in quality of the image projected by the projection optical system 50.

In addition, the transmissive polarizer 67 is connected to the combining optical system 40, and the third seal member 330 seals the gap between the outer member 210 and the combining optical system 40 in the present embodiment. That is, the third seal member 330 does not contact the transmissive polarizer 67. Accordingly, it is possible to prevent the excessive stress or the uneven stress from acting on the transmissive polarizer 67. Accordingly, it is possible to prevent the distortion and deformation of the transmissive polarizer 67 and the deterioration in quality of the image projected by the projection optical system 50. Incidentally, the combining optical system 40 is the cross dichroic prism, and thus, is hardly distorted and deformed as compared to the transmissive polarizer 67. Accordingly, it is possible to prevent the deterioration in quality of the image projected by the projection optical system 50 even if the combining optical system 40 and the third seal member 330 contact each other.

In addition, the cooling mechanism 90 configured to cool the first reflective liquid crystal panel 31 is supported by the outer member 210 in the present embodiment. The liquid crystal panel assembly 81 is integrated via the support member 200, and thus, the entire liquid crystal panel assembly 81 is effectively cooled by the cooling mechanism 90. That is, it is possible to effectively cool not only the first reflective liquid crystal panel 31 but also the first polarizer 61, the second polarizer 62, and the transmissive polarizer 67 using the cooling mechanism 90. Thus, it is possible to prevent thermal deformation of these optical parts, a variation of optical properties of the optical parts caused by heat, a positional deviation of the optical parts caused by heat, and the like. Accordingly, it is possible to prevent the deterioration in quality of the image projected by the projection optical system 50.

In addition, the gap G is formed between the part of the inner member 220 where the second support portion 240 is not provided and the second polarizer 62, and the gas can flow between the first space Ha and the second space Hb in the present embodiment. Accordingly, a deviation of temperature distribution in the liquid crystal panel assembly 81 is prevented, and the cooling effect obtained by the cooling mechanism 90 is evenly exhibited in the entire liquid crystal panel assembly 81.

In the present embodiment, there is a possibility that a part of the first color light Lb which has passed through the first polarizer 61 and is incident to the incident surface 62A of the second polarizer 62 may be reflected by the second polarizer 62 without passing through the second polarizer 62. According to the present embodiment, the first color light Lb proceeds through the sealed internal space H. Accordingly, the leaked light reflected by the incident surface 62A of the second polarizer 62 is absorbed to an inner surface of the outer member 210. Accordingly, it is possible to prevent the deterioration in image quality caused by the leaked light. In addition, it is possible to sufficiently absorb the leaked light by performing a reflected light prevention process on the inner surface of the outer member 210.

Incidentally, a cooling fin may be provided on an outer surface of the outer member 210 in the above-described embodiment. For example, the cooling fin may be provided on an outer surface of the fourth plate portion 214 of the outer member 210. Accordingly, it is possible to more effective prevent the temperature rise of the liquid crystal panel assembly 81.

Incidentally, the outer member 210 of the liquid crystal panel assembly 81, the outer member 210 of the liquid crystal panel assembly 82, the outer member 210 of the liquid crystal panel assembly 83 may be connected to each other using a connecting member to be integrated.

Incidentally, the projection display device 100 is configured to include: the illumination optical system 10 which separates the source light emitted from the light source device 1 into the plurality of color light Lb, Lg and Lr; the plurality of reflective liquid crystal panels 31, 32 and 33 which are arranged in the respective optical paths of the plurality of color light Lb, Lg and Lr to perform the light modulation on the plurality of color light Lb, Lg and Lr; the combining optical system 40 which combines the plurality of color light Lb, Lg and Lr light modulated in the plurality of reflective liquid crystal panels 31, 32 and 33; and the projection optical system 50 which projects the combined light combined by the combining optical system 40 in the above-described embodiment. In the projection display device 100, the illumination optical system 10 does not necessarily separate the source light emitted from the light source device 1 into the plurality of color light, the single reflective liquid crystal panel may be provided, or the combining optical system 40 may be omitted. The constituent elements that have been described in the above-described embodiment can be applied to a projection display device which includes: the light source device 1 that emits source light; one first polarizer which is arranged in an optical path of the source light and passes the source light in a first polarization state; one reflective liquid crystal panel which is arranged in an optical path of the source light and performs light modulation of the source light from the first polarizer based on image data; an illumination optical system which causes the source light to be incident to the reflective liquid crystal panel; one second polarizer which is arranged in an optical path of the source light between the first polarizer and the reflective liquid crystal panel, passes the source light in the first polarization state from the first polarizer, and reflects the source light of a second polarization state from the reflective liquid crystal panel; and a projection optical system which projects the source light reflected by the second polarizer.

According to the present embodiment, it is possible to provide a projection display device which is capable of preventing deterioration in image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection display device comprising:
   a light source device which emits source light;
   a first polarizer which is arranged in an optical path of the source light and passes the source light in a first polarization state;
   a reflective liquid crystal panel which is arranged in an optical path of the source light, and performs light modulation of the source light from the first polarizer based on image data;
   an illumination optical system which causes the source light to be incident to the reflective liquid crystal panel;
   a second polarizer which is arranged in an optical path of the source light between the first polarizer and the reflective liquid crystal panel, passes the source light in the first polarization state from the first polarizer, and reflects the source light in a second polarization state from the reflective liquid crystal panel;
   a projection optical system which projects the source light reflected by the second polarizer;
   a support member which includes an outer member that supports the first polarizer and the reflective liquid crystal panel and an inner member that is fixed to the outer member in an internal space of the outer member and supports the second polarizer; and
   a seal mechanism which seals the internal space, wherein the outer member includes:
      a first opening for passage of the source light incident to the first polarizer;
      a first support portion which is arranged around the first opening and supports an edge of the first polarizer;
      a second opening for passage of the source light incident to the reflective liquid crystal panel; and
      a third opening for passage of the source light incident to the projection optical system, and
   the seal mechanism includes:
      a first seal member which seals the first opening;
      a second seal member which seals the second opening; and
      a third seal member which seals the third opening.

2. The projection display device according to claim 1, wherein,
   the illumination optical system performs color separation of the source light emitted from the light source device to generate the plurality of color light, and
   the reflective liquid crystal panel includes a plurality of reflective liquid crystal panels which are arranged, respectively, in optical paths of the plurality of color light, and
   further comprising a combining optical system which combines a plurality of color light modulated by the reflective liquid crystal panel and reflected by the second polarizer to generate combined light,
   wherein the projection optical system projects the combined light generated by the combining optical system.

3. The projection display device according to claim 1, further comprising
   a cooling mechanism which is connected to the reflective liquid crystal panel,
   wherein the cooling mechanism is supported by the outer member.

4. A projection display device comprising:
   a light source device which emits source light;
   a first polarizer which is arranged in an optical path of the source light and passes the source light in a first polarization state;
   a reflective liquid crystal panel which is arranged in an optical path of the source light, and performs light modulation of the source light from the first polarizer based on image data;
   an illumination optical system which causes the source light to be incident to the reflective liquid crystal panel;
   a second polarizer which is arranged in an optical path of the source light between the first polarizer and the reflective liquid crystal panel, passes the source light in the first polarization state from the first polarizer, and reflects the source light in a second polarization state from the reflective liquid crystal panel;
   a projection optical system which projects the source light reflected by the second polarizer;
   a support member which includes an outer member that supports the first polarizer and the reflective liquid crystal panel and an inner member that is fixed to the outer member in an internal space of the outer member and supports the second polarizer; and
   a seal mechanism which seals the internal space, wherein the inner member includes:
      a fourth opening for passage of the source light incident to the second polarizer; and
      a plurality of second support portions which are arranged around the fourth opening and support an edge of the second polarizer, and
      in the internal space, a gas is allowed to flow from one space of a first space that one surface of the second polarizer faces and a second space that another surface of the second polarizer faces, to the other space.

5. The projection display device according to claim 4, wherein,
   the illumination optical system performs color separation of the source light emitted from the light source device to generate the plurality of color light, and
   the reflective liquid crystal panel includes a plurality of reflective liquid crystal panels which are arranged, respectively, in optical paths of the plurality of color light, and
   further comprising a combining optical system which combines a plurality of color light modulated by the reflective liquid crystal panel and reflected by the second polarizer to generate combined light,
   wherein the projection optical system projects the combined light generated by the combining optical system.

6. The projection display device according to claim 4, further comprising
a cooling mechanism which is connected to the reflective liquid crystal panel, wherein the cooling mechanism is supported by the outer member.

* * * * *